April 19, 1927.　　　　　G. S. DEY　　　　　1,625,076

OPTICAL TEST CHART

Filed Aug. 21, 1924　　　3 Sheets-Sheet 1

INVENTOR.
Gilbert S. Dey
BY
Stockbridge & Borst
ATTORNEYS.

April 19, 1927.  
G. S. DEY  
1,625,076  
OPTICAL TEST CHART  
Filed Aug. 21, 1924  
3 Sheets-Sheet 2
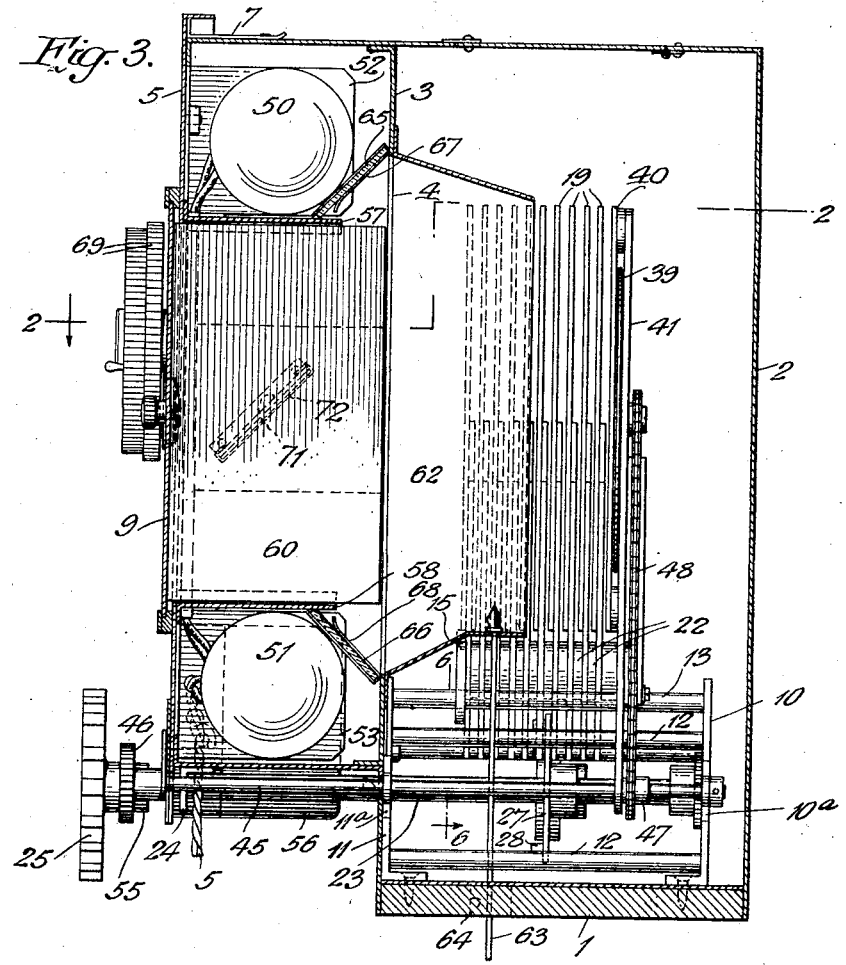
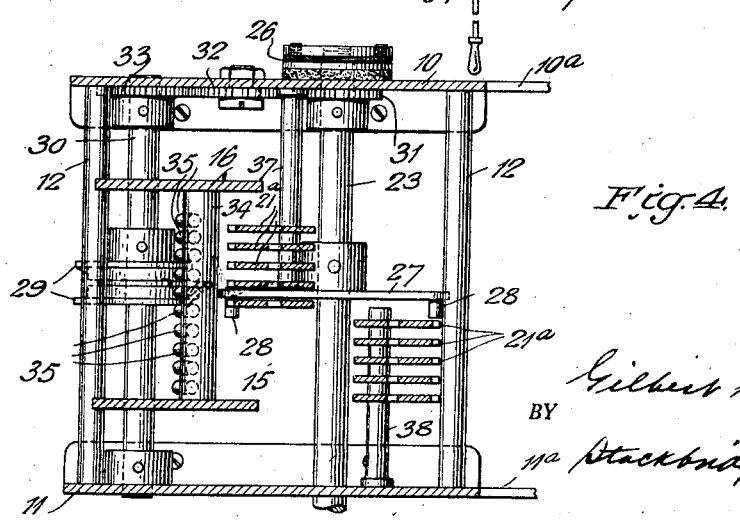
INVENTOR.  
Gilbert S. Dey  
BY  
Stackbridge & Borst  
ATTORNEYS.

April 19, 1927.

G. S. DEY

OPTICAL TEST CHART

Filed Aug. 21, 1924

INVENTOR.
Gilbert S. Dey
ATTORNEYS.

Patented Apr. 19, 1927.

1,625,076

UNITED STATES PATENT OFFICE.

GILBERT S. DEY, OF MOUNT VERNON, NEW YORK, ASSIGNOR TO GENERAL OPTICAL COMPANY, INC., A CORPORATION OF NEW YORK.

OPTICAL TEST CHART.

Application filed August 21, 1924. Serial No. 733,247.

My invention relates to test charts such as are used by optometrists in making subjective optical tests to determine the visual acuity of the patient, and particularly to such charts of the character disclosed in the pending application of Hans Clement and Elmer Le Roy Ryer, Serial No. 701,340, filed March 24, 1924, upon which this invention is an improvement.

The chart as disclosed in the said pending application comprises a casing having a front observation opening and provided some distance back in this opening with a partition in which is a corresponding opening. Set well back within the casing, behind the partition is an astigmometer, and between the astigmometer and the partition are a plurality of charts mounted in suitable holders so as to be moved successively into and out of line with the observation opening. One or more lamps are disposed behind the front wall at the sides of the observation openings, screens being arranged so as to shield the lights from direct view, while allowing them to illuminate the charts or astigmometer with an evenly distributed, diffused light. The observation opening may be closed by a shutter, and a translucent hole through the front wall adjacent one of the lamps provides a source of light for color and other screens rotatively mounted on the front wall.

The operating means for the chart include a carriage on which the charts are mounted and which is moved backward and forward as a chart is brought into and out of observation position so that each chart appears in the same plane, and a shaft for operating these parts has a hand knob on the outside of the casing. Another manually operated shaft controls the astigmometer, while a third knob controls a rheostat in series with the lamps.

My invention comprehends improved and simplified mechanism for operating the charts and astigmometer. In accordance with my invention I impart the requisite movement to the carriage to bring the particular chart into the proper plane and then shift the chart while the carriage is stationary. The particular mechanism herein disclosed for effecting these operations includes a cam operative upon the carriage to impart a step-by-step movement to the carriage, and a shift lever operatively connected to the cam and set to shift a chart brought within its path following the functioning of the cam.

The astigmometer, in accordance with my invention, is also mounted on the carriage so as to be brought thereby into the proper plane for observation, and the driving means therefor are so associated with the knob-operated parts as to have operative connection therewith, when the carriage is adjusted to bring the astigmometer into the plane of observation.

My invention also comprehends an improved construction for the front of the casing, including the feature of a removable front which carries on its inner face the lamps and housings therefor, as well as the rheostat. Also in accordance with my invention the special testing devices for color vision, muscle tests, etc., are mounted on the slidable shutter carried by the removable front, and a mirror for reflecting the light forwardly for this purpose is mounted on and carried by the shutter so as to be brought into proper relation to the lamp when the shutter is closed.

My invention also includes various other details and features of construction as will appear from the following description of one embodiment thereof. I shall now describe the embodiment illustrated in the drawings, and shall thereafter point out my invention in claims:

Fig. 3 is a sectional elevation on line 3—3 of Figure 2;

Fig. 4 is a fragmentary sectional plan on line 4—4 of Figure 6;

Figure 1:
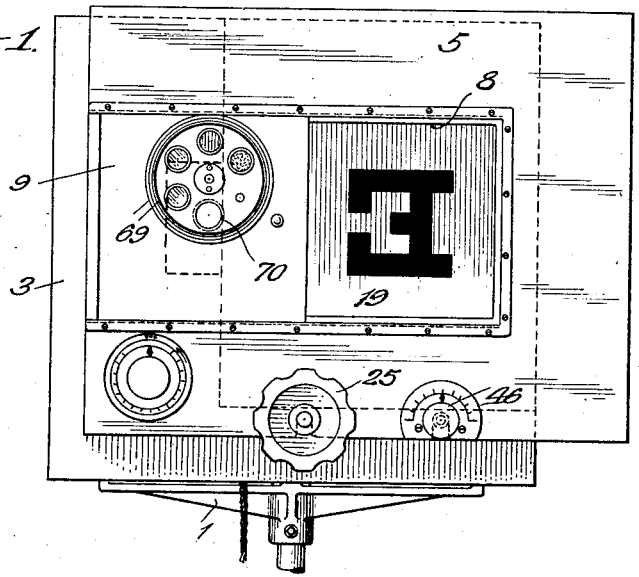
Fig. 1 is a front elevation of a complete device embodying my invention.

The casing for the device, which is preferably of sheet metal is shown as having a main compartment in which the charts and the operating mechanism therefor are contained, and on the front thereof a smaller compartment in which the lamps are contained. The casing is rectangular and has a substantial base which may form part of a supporting casting 1 and to which the sheet metal is attached. The rear wall 2 of the casing is made removable. The front wall 3 of the main casing forms a partition between the two compartments and has at one side of the center a rectangular observation opening 4 in back of which the charts are adapted to be brought. The front compartment in which the lamps are contained is also rectangular but somewhat smaller than the main compartment, the walls being continuous on the top and on the right sides, while the bottom and left side are set in substantially from the corresponding sides of the main compartment. The front of this lamp compartment is closed by a removable member 5, which is also of sheet metal and is attached to the casing by hooks 6, which hook over lugs on the sides of the casing near the bottom thereof, and a latch 7 at the top which snaps over a catch on the top wall of the casing. This removable front 5 has a rectangular opening 8 of substantially the same dimensions as those of the opening 4 and disposed in line with the opening 4 when the front is applied. A shutter 9 for this opening 8 slides laterally in guides on the outer face of the removable front member 5. For the sake of symmetrical appearance the right side of the removable front 5 is shown as continued out beyond the side wall of the casing sufficiently to bring the opening 8 nearer the middle of the front.

Secured on the bottom of the main casing is a supporting frame consisting of a rear bracket plate 10 near the back wall, and a front bracket plate 11 against the front wall of the main casing. In addition to being secured, as by screws, to the bottom, these bracket plates are tied together by four tie rods 12. The bracket plates are substantially duplicates, each being oblong with a flanged foot, and each having a bearing arm extending from its right side, the arm on the plate 10 being numbered 10ª, and the arm on the plate 11 being numbered 11ª. Connecting the upper corners of the plates 10 and 11 are two guide rods 13 and 14, on which slides the chart-holding carriage.

Figure 6:
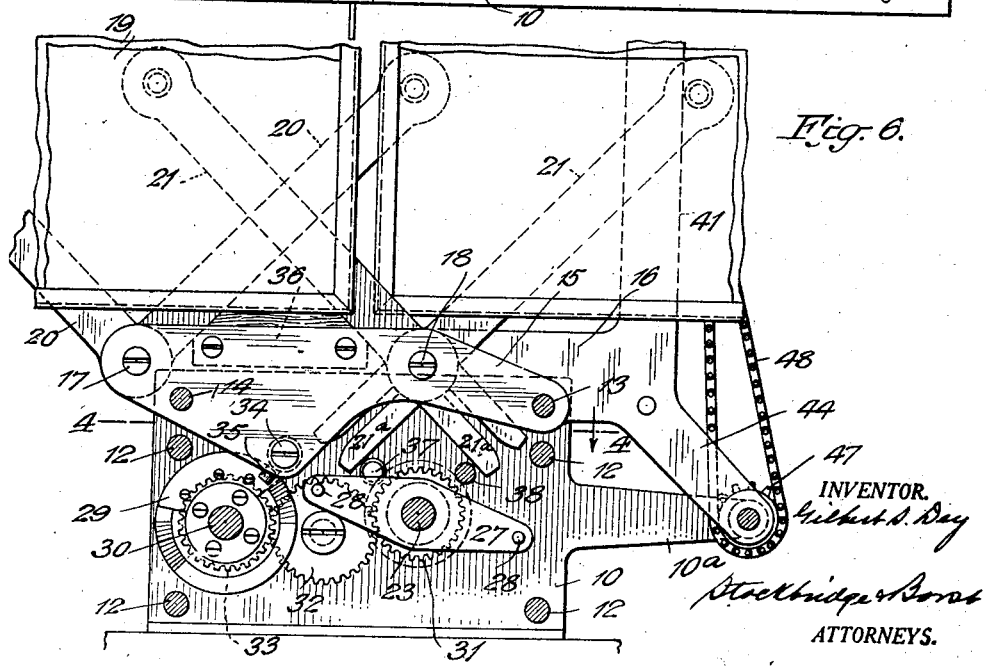
Fig. 6 is a partial sectional elevation looking rearwardly and taken on line 6—6 of Figure 3.

This carriage consists of a front plate 15 and a rear plate 16 connected by two pivot shafts 17 and 18 (see Fig. 6). The charts are hinged to these pivots by means of parallel linkage. The holder for each chart 19 has two links 20 and 21 pivoted thereto at points in a horizontal line and spaced the distance between the pivots 17 and 18, the other end of the links being pivoted on the pivots 17 and 18. Suitable spacers 22 are provided on the pivots 17 and 18 between the ends of the links 20 and 21. In this way the charts are kept upright as they are swung into and out of observation position. The chart holders are preferably open at the top for the removal and insertion of the charts, a hinged opening being provided in the top of the casing to afford access to the charts.

Beyond the pivot 18 the links 21 have a slotted extension 21ª, which is the part engaged in the shifting of the charts. The chart-shifting mechanism and the carriage-translating mechanism will now be described.

Figure 2:
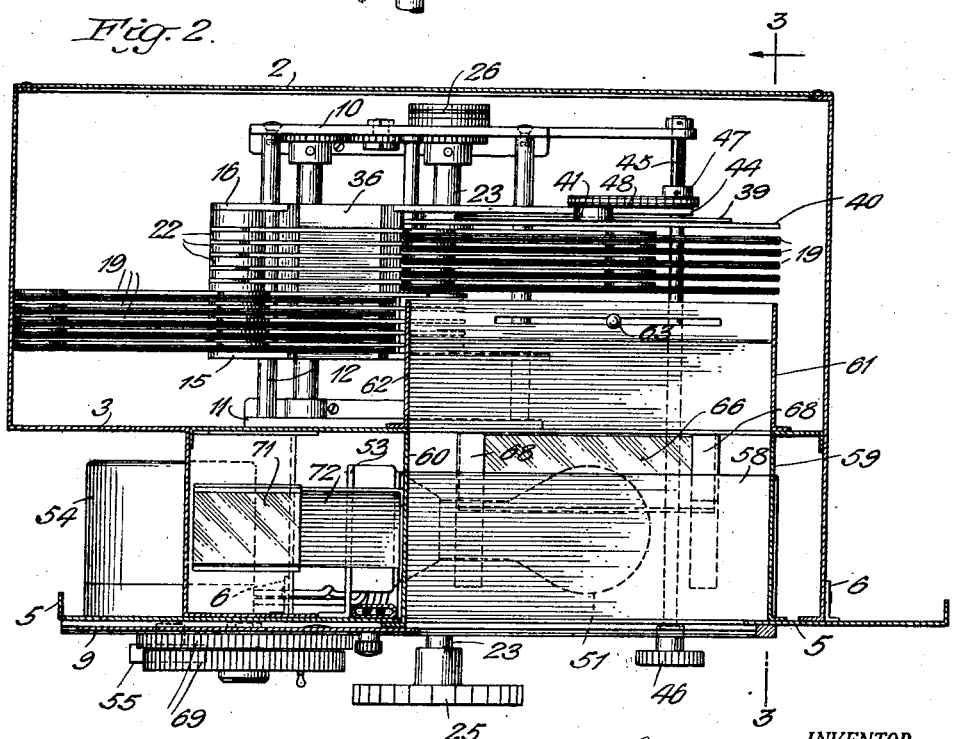
Fig. 2 is a sectional plan thereof on broken line 2—2 of Figure 3.
Figure 5:
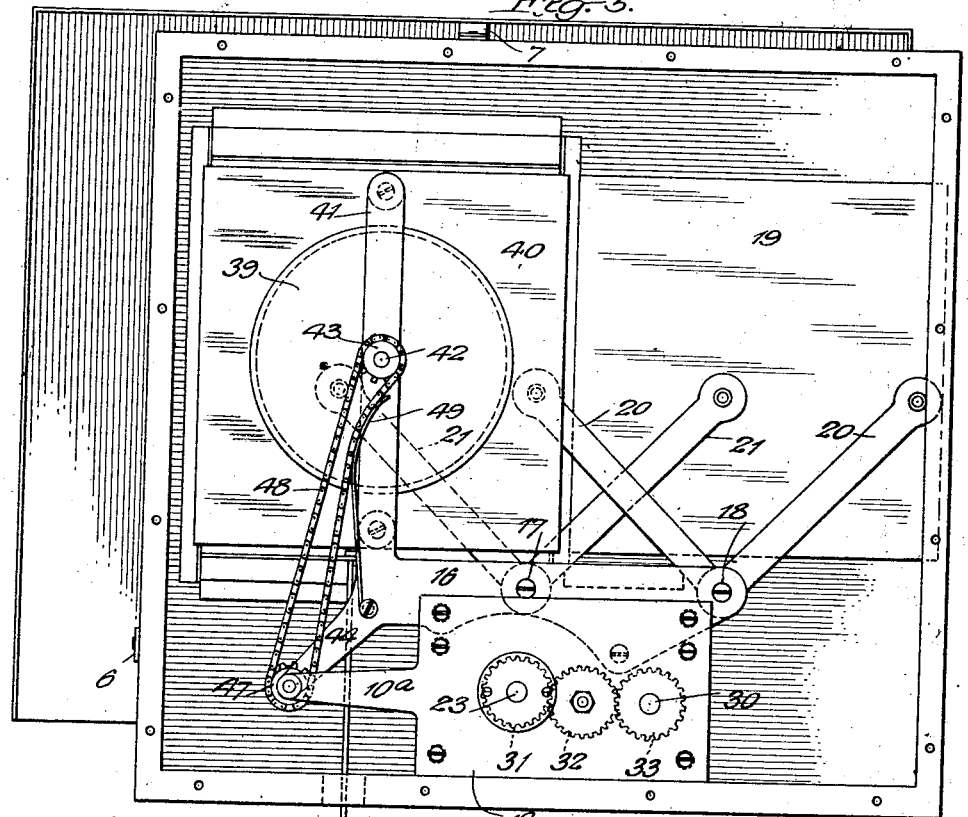
Fig. 5 is a rear elevation with the back wall removed.

A manually operated shaft 23, which protrudes through the front of the casing, extends from the front to the rear of the casing below the observation openings and bears at its rear end in the bracket plate 10 and near its front end in an angle bracket 24 (see Figs. 2 and 3). On the bottom of the lamp compartment of the casing, and between its ends it also has a bearing in the front bracket plate 11. This shaft has on its front end a knurled knob 25 for manual operation. On the rear face of the bracket plate 10 the shaft 23 has a friction washer 26 (see Fig. 4) which will hold the shaft in any angular position to which it is turned. Secured on the shaft 23 substantially midway between the bracket plates 10 and 11 is a shift lever 27 which has two oppositely extending arms in the ends of which are lateral pins 28. As the shaft 23 is turned, these pins 28 are adapted to engage in the slots in the extensions 21ª of the links 21 and shift the charts from one position to another. Since the pins 28 are 180° apart, it follows that the lever will shift two charts during each complete rotation.

Geared to the shaft 23 is a cam which operates upon the carriage to move it step by step and so bring the extensions 21ª successively into the path of the pins 28. The cam is shown as a double-acting face cam 29 which is mounted upon a shaft 30 bearing in the bracket plates 10 and 11 parallel with the shaft 23. The gearing connection between the shafts 23 and 30 consists of a spur gear 31 on the shaft 23 against the inner face of the plate 10, an idler gear 32 and a spur gear 33 on the shaft 30. These gears are of the same size; therefore the cam 29 will have the same angular speed as the shift lever 27.

Connecting the bottom of the plates 15 and 16 of the carriage adjacent the cam 29 is a shaft 34 on the under side of which is a row of cam-engaging teeth or pins 35. The cam 29 by its engagement with these teeth 35 will move the carriage two steps for each complete rotation of the cam.

On the top of the carriage is a wooden insert 36 with beveled edges which will serve to cushion the links as the charts are shifted from one position to another. Extending forwardly from the inner face of the plate 10 is a stud 37 which terminates just short of the plane of observation of the chart, and in the path of movement of the extensions 21ª of those charts back of the plane of observation. Also a stud 38 extends rearwardly from the plate 11 and terminates just short of the plane of observation of the charts, being disposed in the position to lock the charts which are disposed in front of the plane of observation. It will, therefore, be seen that only that chart which is in the plane between the ends of the studs 37 and 38 can be shifted, and it is in this plane that the pins 28 on the shift lever are disposed.

It will be seen that the turning of the knob 25 in a clockwise direction as viewed in Fig. 1 will result in the movement of the carriage toward the front of the casing, and vice versa. The five front charts, as shown, are out of line with the observation openings and the five rear charts are in line with the observation opening, the foremost of the latter five being in the plane of observation. It may be assumed that the shaft 23 is being turned in a clockwise direction, as the charts are shown in Fig. 6. The one cam face has, therefore, just functioned to move the carriage forward one step and thus bring the sixth chart into the plane of observation, which position it is shown as occupying. The continued movement of the shaft 23 will cause the adjacent pin 28 to move into the slot of the extension 21ª of the link 21 on this sixth chart and swing the chart out of observation position. The lever 27 is so set relative to the cam face that its function follows the movement of the carriage. In other words, the chart shifting operation occurs between the operation of the cam face. By the time that the shaft 23 has rotated 180° from the position shown in Fig. 6, the sixth chart will have been moved out of observation position and the cam face shown at the left of this figure will have rotated between the teeth 35 and shifted the carriage another step, when the other pin 28 will be ready to enter the slotted extension on the link 21 of the seventh chart. Manifestly, a reverse rotation of the shaft 23 will effect a reverse operation.

An astigmometer 39 is rotatably mounted in a circular opening in a rectangular holder 40 back of the charts 19. The holder 40 is mounted on an arm 41 extending up from and integral with the right end of the rear carriage plate 16. A stub shaft 42 which is secured to the center of the astigmometer bears in the arm 41 and forms the axis of rotation of the astigmometer. A sprocket wheel 43 is secured on the outer end of this stub shaft 42 against the outer face of the arm 41 and rotation of this sprocket wheel will, therefore, cause rotation of the astigmometer. An arm 44 extends obliquely downward from the lower right hand corner of the plate 16 and has its end in line with the ends of the arms 10ª and 11ª. A shaft 45, parallel with the shaft 23 bears in the ends of the arms 10ª, 11ª and 44, and has an operating knob 46 on its front end in front of the casing. A sprocket wheel 47 is splined on the shaft 45, and a sprocket chain 48 connects the sprocket wheels 43 and 47. A flat spring 49 on the face of the plate 16 bears against the sprocket chain and holds it taut. It is evident that in this way the sprocket wheel 47 will be caused to travel with the carriage and thus hold the shaft 45 in operative connection with the astigmometer in all positions of adjustment of the carriage. A pointer on the shaft 45 just inside the knob 46 may cooperate with a scale on the face of the removable front 5 to denote the position of the astigmometer.

The bottom edge of the removable front 5 is slotted so as to go over the shafts 23 and 45. This front has secured on its inner face lamp sockets above and below the opening 8 and so positioned that the lamps 50 and 51 in the sockets will be disposed directly above and below the opening. These lamp sockets are secured to L-shaped brackets 52 and 53, respectively. A rheostat 54 is secured on the left side of the inner face of the removable front 5 so that it comes outside of the casing when the front is applied, the operating knob 55 therefor being on the outer face of the front. The cable 56 enters through a hole in the bottom of the lamp compartment and goes to the rheostat and thence in parallel to the lamp sockets, the leads to the lamp 50 passing up through a conduit against the inner face of the front.

Extending inwardly from the top and bottom edges of the opening 8 are shields 57 and 58, respectively, which serves as top and bottom walls for the observation passage and screen the light from the lamps from the eyes of the observer. These screens have their outer edges flanged and the flanges are secured against the inner face of the removable front. The ends of the screens are turned downwardly and upwardly, respectively. The side walls of the observation passage within the lamp compartment are formed on the right side by an inwardly extending wall 59 attached to the inner face of the removable front 5, and on the left side by an inwardly extending wall 60 which is secured to the right end of the inner face of the shutter 9. The flanged ends of the screens 57 and 58 just overlap the wall members 59 and 60 in the open position of the shutter.

The observation passage is continued within the main compartment by side members 61 and 62 secured to the wall 3 on opposite sides of the opening 4. The top and bottom of this portion of the passage converges rearwardly, the front end being large enough to admit light from the lamps 50 and 51 to illuminate the charts in observation position. The rear of this passage is substantially in the plane of the space between the studs 37 and 38, and the bottom of the passage is horizontal for a portion of its distance from the rear and has a slot therethrough for the admission of a pointer 63 which passes up through an opening 64 in the bottom of the casing and has a removable head which will retain the inner end of the pointer within the casing.

In order to cause the light to be properly diffused upon the charts, suitable diffusing screens 65 and 66 may be employed between the lamps and the chart, and they may be conveniently held in clips 67 and 68 secured, respectively, on the top and bottom faces of the screens 57 and 58.

Special transparent testing devices may be secured in concentric rotative holders 69 on the front face of the shutter 9. These may be muscle-testing devices and devices for testing color vision and the like, such, for instance, as shown in the said co-pending application Serial No. 701,340. A translucent hole 70 is provided through the shutter, and if desired, a collecting lens may be disposed in this hole. In order to direct the light through this translucent hole in the shutter for the purpose of these tests, a mirror 71 is shown as secured on a bracket 72 attached to the left face of the wall member 60 and disposed at an angle of 45° directly below the lamp 50. The screen 57 will have an opening therethrough, as indicated, to admit light to this reflector, and, if desired, a removable closure (not shown) may be provided for this hole in order to prevent the escape of light therethrough when the charts are being observed. In order to accommodate the reflector 71 within the casing when the shutter is open, an extension is shown as formed on the left side of the lamp compartment, this extension being indicated by dotted lines in Figs. 1 and 3.

When the shutter is closed the wall member 60 is carried along to the right in proximity to the wall member 59, and with it is carried the mirror 71. In this position, the light from the lamp 50 strikes the mirror, to be reflected through the hole 70 and thence through the various transparent testing devices in the holder 69 as they are successively brought in line with the hole 71.

It is obvious that various modifications may be made in the construction shown in the drawings and above particularly described within the principle and scope of the invention as expressed in the appended claims.

I claim:

1. An optical test chart comprising a casing having a front observation opening, a carriage within the casing movable toward and from the opening, a plurality of charts on the carriage mounted to move to and from observation position before the opening, means for imparting a step-by-step movement to the carriage, and chart-shifting means so operatively connected to the carriage moving means as to operate upon the charts between the steps of the carriage movement.

2. An optical test chart comprising a casing having a front observation opening, a carriage within the casing movable toward and from the opening, a plurality of charts on the carriage mounted to move to and from observation position before the opening, a rotative cam operative to impart a step-by-step movement to the carriage, and a manually operative rotative shifting device for the charts operatively connected to the cam and timed to operate between the operations of the cam.

3. An optical test chart comprising a casing having a front observation opening, a carriage within the casing movable toward and from the opening, a plurality of charts on the carriage mounted to move to and from observation position before the opening, a plurality of equally spaced cam engaging teeth on the carriage disposed in a row, a rotative cam disposed in operative relation to the teeth and coactive therewith to move the carriage step-by-step, and a manually operative chart shifting device operatively connected with the cam.

4. An optical test chart comprising a casing having a front observation opening, a carriage within the casing movable toward and from the opening, a plurality of charts on the carriage mounted to move to and from observation position before the opening, two shafts operatively connected, a cam on one shaft operative to move the carriage step-by-step, and a shift lever for the charts on the other shaft angularly positioned thereon to engage the charts between the cam impulses.

5. An optical test chart comprising a casing having a front observation opening, a carriage within the casing movable toward and from the opening, a plurality of charts on the carriage mounted to move to and from observation position before the opening, two operatively connected shafts one of which has provision for manual operation, a plurality of cam engaging teeth on the carriage, a double acting cam on one shaft having two diametrically opposite cam portions coactive with the teeth to move the carriage step-by-step, and a chart shifting lever on the other shaft having two oppositely extending shifting arms set to engage the charts between the movements of the carriage.

6. An optical test chart comprising a casing provided with a front observation opening, a carriage within the casing movable toward and from the opening, a plurality of charts mounted on the carriage by parallel linkage, each chart having two parallel links pivoted at one end to the chart and at the other end to the carriage, and manually operated means for moving the carriage and for shifting the charts to and from operation position before the opening.

7. An optical test chart comprising a casing provided with a front observation opening, a carriage within the casing movable toward and from the opening, a plurality of charts mounted on the carriage by parallel linkage, each chart having two parallel links pivoted at one end to the chart and at the other end to the carriage, one of the links being extended beyond the pivot on the carriage and having an open longitudinal slot in its extended end, a manually operative rotative shift lever having a lateral pin engageable in the slot during the rotation of the lever, and means for moving the carriage to bring the chart links successively into operative relation to the shift lever.

8. An optical test chart comprising a casing provided with a front observation opening, a carriage within the casing movable toward and from the opening, a plurality of charts mounted on the carriage by parallel linkage, each chart having two parallel links pivoted at one end to the chart and at the other end to the carriage, one of the links being extended beyond the pivot on the carriage and having an open longitudinal slot in its extended end, a manually operative rotative shift lever having a lateral pin engageable in the slot during the rotation of the lever, and a rotative cam operatively connected to the shift lever and adapted to actuate the carriage step-by-step, the cam and shift lever being so related as to operate successively.

9. An optical test chart comprising a casing provided with a front observation opening, a carriage within the casing movable toward and from the opening and having a plurality of cam engaging teeth along one side, a cam shaft and cam thereon coactive with the teeth to move the carriage step-by-step in either direction, a plurality of charts pivotally mounted on the carriage so as to swing to and from observation position before the opening and having a slotted extension beyond the pivot, a manually operable shaft operatively connected to the cam shaft to rotate therewith at the same angular speed, and a shift lever thereon having a lateral pin engageable in the said slots as the extensions are brought into its path by the cam.

10. An optical test chart comprising a casing provided with a front observation opening, a carriage within the casing movable toward and from the opening, a plurality of charts mounted on the carriage and movable independently into and out of the line of the opening, an astigmometer rotatively mounted on the carriage in the line of the opening back of the charts, manually operative means for moving the carriage and shifting the charts, and manually operative means for rotating the astigmometer.

11. An optical test chart comprising a casing provided with a front observation opening, a carriage within the casing movable toward and from the opening, a plurality of charts mounted on the carriage and movable independently into and out of the line of the opening, an astigmometer rotatively mounted on the carriage in the line of the opening back of the charts, a manually operative chart shifting shaft having a shift lever thereon, a cam operatively connected to said shaft and operative to translate the carriage to bring the charts successively into operative relation to the shift lever, and an astigmometer operating shaft extending normal to the plane of the opening and having operative connection with the astigmometer in all positions of adjustment thereof.

12. An optical test chart comprising a casing provided with a front observation opening, a carriage within the casing movable toward and from the opening, a plurality of charts mounted on the carriage and movable independently into and out of the line of the opening, an astigmometer rotatively mounted on the carriage in the line of the opening back of the charts, a manually operative chart shifting shaft having a shift lever thereon, a cam operatively connected to said shaft and operative to translate the carriage to bring the charts successively into operative relation to the shift lever, an astigmometer operating shaft extending normal to the plane of the opening, a drive member splined theron and movable with the carriage, and a drive connection between said member and the astigmometer.

13. An optical test device comprising a casing having a front observation opening, a plurality of charts in the casing movable into and out of line with the opening, a lamp within the casing on one side of the opening arranged to illuminate a chart in observation position, a slidable shutter for the opening having a translucent opening therethrough, a rotative holder for transparent test devices pivoted on the front of the shutter before the translucent opening, and an angularly disposed reflector carried by the shutter within the casing and in line with the lamp so as to reflect light therefrom through the translucent opening when the shutter is closed.

14. An optical test device comprising a casing having a front observation opening, a plurality of charts in the casing movable into and out of line with the opening, two lamps disposed respectively above and below the opening for illuminating a chart in observation position, opaque shields extending inwardly from the top and bottom of the opening, one of the shields having an opening therein, a slidable shutter for the observation opening having a translucent opening therethrough, a rotative holder for transparent test devices pivoted on the front of the shutter so as to bring its test devices successively before the translucent opening, and an angularly disposed reflector carried by the shutter within the casing and arranged to be brought before the opening in the light shield when the shutter is closed and reflect light therefrom through the translucent opening.

15. An optical test device comprising a main casing having an observation opening in its front wall, a plurality of charts in the casing movable into and out of line with the opening, an open front lamp chamber on the front of the casing, a removable front for the lamp chamber having an observation opening therein disposed in line with that in the front wall of the casing when the removable front is in place, two lamp sockets carried by the removable front on opposite sides of the observation opening, a slide shutter on the front for the observation opening, two shield members carried by the removable front and extending inwardly from the sides of the observation opening adjacent the lamp sockets and forming two sides of an observation passage, a third side for said passage carried by the removable front, and a fourth side carried by the shutter.

16. An optical test device comprising a main casing having an observation opening in its front wall, a plurality of charts in the casing movable into and out of line with the opening, an open front lamp chamber on the front of the casing, a removable front for the lamp chamber having an observation opening therein disposed in line with that in the front wall of the casing when the removable front is in place, two lamp sockets carried by the removable front on opposite sides of the observation opening, a slide shutter on the front for the observation opening, two shield members carried by the removable front and extending inwardly from the sides of the observation opening adjacent the lamp socket, and a light diffusing screen carried by each shield member between the observation position of the charts and the respective spaces occupied by lamps in the said sockets.

17. An optical test device comprising a main casing having an observation opening in its front wall, a plurality of charts in the casing movable into and out of line with the opening, an open front lamp chamber on the front of the casing, a removable front for the lamp chamber having an observation opening therein disposed in line with that in the front wall of the casing when the removable front is in place, two lamp sockets carried by the removable front on opposite sides of the observation opening, a slide shutter on the front for the observation opening, two shield members carried by the removable front and extending inwardly from the sides of the observation opening adjacent the lamp sockets and forming two sides of an observation passage, a third side for said passage carried by the removable front, a fourth side carried by the shutter, the shutter having a translucent opening therein, and a reflector carried by said fourth side and disposed to reflect light from a lamp in one of the sockets, through the translucent opening.

In witness whereof, I hereunto subscribe my signature.

GILBERT S. DEY.